US 8,406,507 B2

(12) United States Patent
Ruzon et al.

(10) Patent No.: US 8,406,507 B2
(45) Date of Patent: Mar. 26, 2013

(54) METHOD AND SYSTEM FOR REPRESENTING IMAGE PATCHES

(75) Inventors: Mark A. Ruzon, Mountain View, CA (US); Raghavan Manmatha, Belchertown, MA (US); Donald Tanguay, Sunnyvale, CA (US)

(73) Assignee: A9.com, Inc., Palo Alto, CA (US)

( * ) Notice: Subject to any disclaimer, the term of this patent is extended or adjusted under 35 U.S.C. 154(b) by 1108 days.

(21) Appl. No.: 12/319,992

(22) Filed: Jan. 14, 2009

(65) Prior Publication Data
US 2010/0177966 A1 Jul. 15, 2010

(51) Int. Cl.
G06K 9/00 (2006.01)
G06K 9/32 (2006.01)
(52) U.S. Cl. .................. 382/154; 382/284; 382/294
(58) Field of Classification Search ............ 345/423, 345/427, 435, 584, 588, 598; 382/154, 236, 382/284, 278, 293, 294, 162, 107; 358/250
See application file for complete search history.

(56) References Cited

U.S. PATENT DOCUMENTS

| | | | |
|---|---|---|---|
| 3,001,439 A | 9/1961 | Rouy | |
| 5,611,000 A | 3/1997 | Szeliski et al. | |
| 5,694,491 A | 12/1997 | Brill et al. | |
| 5,974,159 A | 10/1999 | Lubin et al. | |
| 6,075,905 A * | 6/2000 | Herman et al. | 382/284 |
| 6,307,959 B1 * | 10/2001 | Mandelbaum et al. | 382/154 |
| 6,580,811 B2 | 6/2003 | Maurer et al. | |
| 7,109,987 B2 | 9/2006 | Goel et al. | |
| 7,894,689 B2 * | 2/2011 | Liu et al. | 382/284 |
| 8,126,247 B2 * | 2/2012 | Chiang et al. | 382/131 |
| 8,126,272 B2 * | 2/2012 | Carr et al. | 382/181 |
| 2002/0181745 A1 | 12/2002 | Hu | |
| 2007/0047767 A1 | 3/2007 | Watabe | |
| 2008/0060034 A1 | 3/2008 | Egnal et al. | |
| 2008/0298718 A1 * | 12/2008 | Liu et al. | 382/284 |
| 2008/0304753 A1 * | 12/2008 | Sohma et al. | 382/218 |

OTHER PUBLICATIONS

Chneg et al , "Robust Affine Invariant Feature Extraction for Image Matching", IEEE Geoscience and Remote Sensing Letters, vol. 5, No. 2, April 2008.*
Lowe, D.G..2004. Distinctive Image Features from Scale-Invariant Keypoints. Jan. 5, 2004.*
International Search Report mailed on Mar. 2, 2010, for International Application No. PCT/10/20943 filed on Jan. 13, 2010, 3 pages.

(Continued)

*Primary Examiner* — Andrae S Allison
(74) *Attorney, Agent, or Firm* — Novak Druce Connolly Bove + Quigg LLP

(57) ABSTRACT

A method, system and computer program product for representing an image is provided. The image that needs to be represented is represented in the form of a Gaussian pyramid which is a scale-space representation of the image and includes several pyramid images. The feature points in the pyramid images are identified and a specified number of feature points are selected. The orientations of the selected feature points are obtained by using a set of orientation calculating algorithms. A patch is extracted around the feature point in the pyramid images based on the orientations of the feature point and the sampling factor of the pyramid image. The boundary patches in the pyramid images are extracted by padding the pyramid images with extra pixels. The feature vectors of the extracted patches are defined. These feature vectors are normalized so that the components in the feature vectors are less than a threshold.

36 Claims, 5 Drawing Sheets

OTHER PUBLICATIONS

"Distinctive Image Features from Scale-Invariant Keypoints" by David G. Lowe, International Journal of Computer Vision, vol. 60, pp. 91-110 (Jan. 2004).

"Reliable Feature Matching Across Widely Separated Views" by Adam Baumberg, Proceedings of Computer Vision and Pattern Recognition, vol. 1, pp. 1774-1781 (2000).

"Local Grayvalue Invariants for Image Retrieval" by Cordelia Schmid and Roger Mohr, IEEE Transactions on Pattern Analysis and Machine Intelligence, vol. 19, pp. 530-535 (May 5, 1997).

"Learning Local Image Descriptors" by Simon A. J. Winder and Matthew Brown, Proceedings of Computer Vision and Pattern Recognition (2007).

* cited by examiner

METHOD AND SYSTEM FOR REPRESENTING IMAGE PATCHES

BACKGROUND OF THE INVENTION

The invention relates generally to the field of digital image processing. More specifically, the invention relates to a method and system for representing the content of an image so that it can be matched with another image containing the same content.

Image matching is a fundamental technique that is being used in computer vision, object recognition, motion tracking, 3D modeling, and the like. Image matching is performed to check whether two images have the same content. The two images that need to be compared may not be exactly the same. For example, one image may be rotated or taken from a different viewpoint as compared to the other image, or it may be a zoomed version of the other image. Further, the two images may be taken under different lighting conditions. Despite such variations in the two images, they contain the same content, scene or object. Therefore, image matching techniques are used to match images effectively.

Typical image matching algorithms take advantage of the fact that an image of an object or scene contains a number of feature points. Feature points are specific points in an image which are robust to changes in image rotation, scale, viewpoint or lighting conditions. This means that these feature points will often be present in both the images, even if the two images differ in the manner described earlier. These feature points are also known as 'points of interest'. Therefore, the first stage of the image matching algorithm is to find these feature points in the image. Typically, an image pyramid is constructed to determine the feature points of an image. The image pyramid is the scale-space representation of the image, i.e., it contains various pyramid images, each of which is a representation of the image at a particular scale. The scale-space representation enables the image matching algorithm to match images that differ in overall scale.

After determining the feature points of all pyramid images in the image pyramid, typical image matching algorithms determine the orientation of each feature point. The orientation of a feature point is determined based on the local image gradient at the feature point. Orientation is used to obtain invariance to rotation. After the feature points and their orientations are determined, a patch is extracted around the feature point in such a way that the orientation vector forms one axis of the reference frame for the patch. The local image gradients on this patch are calculated and transformed into a feature vector representation. The feature vector representation takes into account significant change in local distortion and illumination, i.e., the feature vector is invariant to distortion and change in lighting conditions.

The feature points, their orientations and their feature vectors over all pyramid images form a complete representation of the image. These representations can be compared across images to find a matching image.

There are various limitations associated with the existing methods for representation of images. First, the image may contain a large number of feature points. Some of these feature points are less significant than others in the representation of images and unnecessarily increase the complexity of the image matching algorithm. Second, different methods exist for determining the orientation of a feature point and these methods produce different results. Therefore, any single method cannot be relied on to determine the orientation. Further, if two or more orientations of a feature point are produced, they increase the complexity of the image matching algorithm. Third, sampling algorithms used to extract a patch around the feature point are not sensitive to the actual scale. Therefore, these methods do not take into account the fact that patch size should increase as scale increases even if the image size stays constant. Fourth, the patches around the boundary of the image are not extracted because the patches may extend beyond the image boundary. This is undesirable since boundary patches often make a significant contribution to the overall image matching algorithm, especially as the image size decreases. Finally, some components present in a feature vector of a feature point may be large due to an edge passing through the patch. Such a feature vector is not robust to changes in illumination. Existing methods improve robustness by normalizing the feature vector but do not guarantee it numerically.

There exists a need for an improved image-representation method for overcoming the numerous limitations mentioned above.

SUMMARY

An objective of the present invention is to provide a method, system and computer program product for improved representation of images so that two or more images can be matched effectively.

Another objective of the present invention is to provide a method, system and computer program product for intelligently replacing a group of orientations of a feature point with a single orientation.

Yet another objective of the present invention is to provide a method, system and computer program product for using the scale of a pyramid image to extract a patch around the feature point more robustly.

Yet another objective of the present invention is to provide a method, system and computer program product for extracting and using the boundary patches of an image while representing images.

Yet another objective of the present invention is to provide a method, system and computer program product for representing the image in the form of robust feature vectors which do not contain components greater than a specified threshold.

Various embodiments of the present invention provide a method, system and computer program product for representing an image. A Gaussian pyramid of the image is formed which consists of different pyramid images. The pyramid image is a transformed version of the original image at a particular scale parameter. Thereafter, the feature points of the pyramid image are identified. A specified number of feature points are selected from all the identified feature points. The orientation of the feature point is determined by combining the orientations obtained from a set of orientation calculating algorithms. Thereafter, a patch is extracted around the feature point. The patch around the feature points present on the boundary of the pyramid image is extracted by padding the pyramid image with extra pixels. Further, the sampling used to extract the patch is based on an orientation of the feature point and a pre-defined sampling factor of the pyramid image. Thereafter, a feature vector is defined for each of the extracted patches. The feature vector is normalized in such a way that no component of the feature vector is greater than a specified threshold.

BRIEF DESCRIPTION OF THE DRAWINGS

Various embodiments of the invention will hereinafter be described in conjunction with the appended drawings pro

Skilled artisans will appreciate that the elements in the figures are illustrated for simplicity and clarity to help improve understanding of the embodiments of the present invention.

DETAILED DESCRIPTION OF THE INVENTION

Various embodiments of the present invention relate to a method, system and computer program product for representing an image. The method uses the feature points present in the image to describe the image. Therefore, the first step in the method is to determine the feature points in the image. Thereafter, the orientation of the feature points is determined by combining the orientations obtained from a set of orientation calculating algorithms. Thereafter, a patch is extracted around the feature points and a feature vector is defined for the extracted patches. The feature vector is normalized in such a way that no component of the feature vector is greater than a specified threshold.

Figure 1:
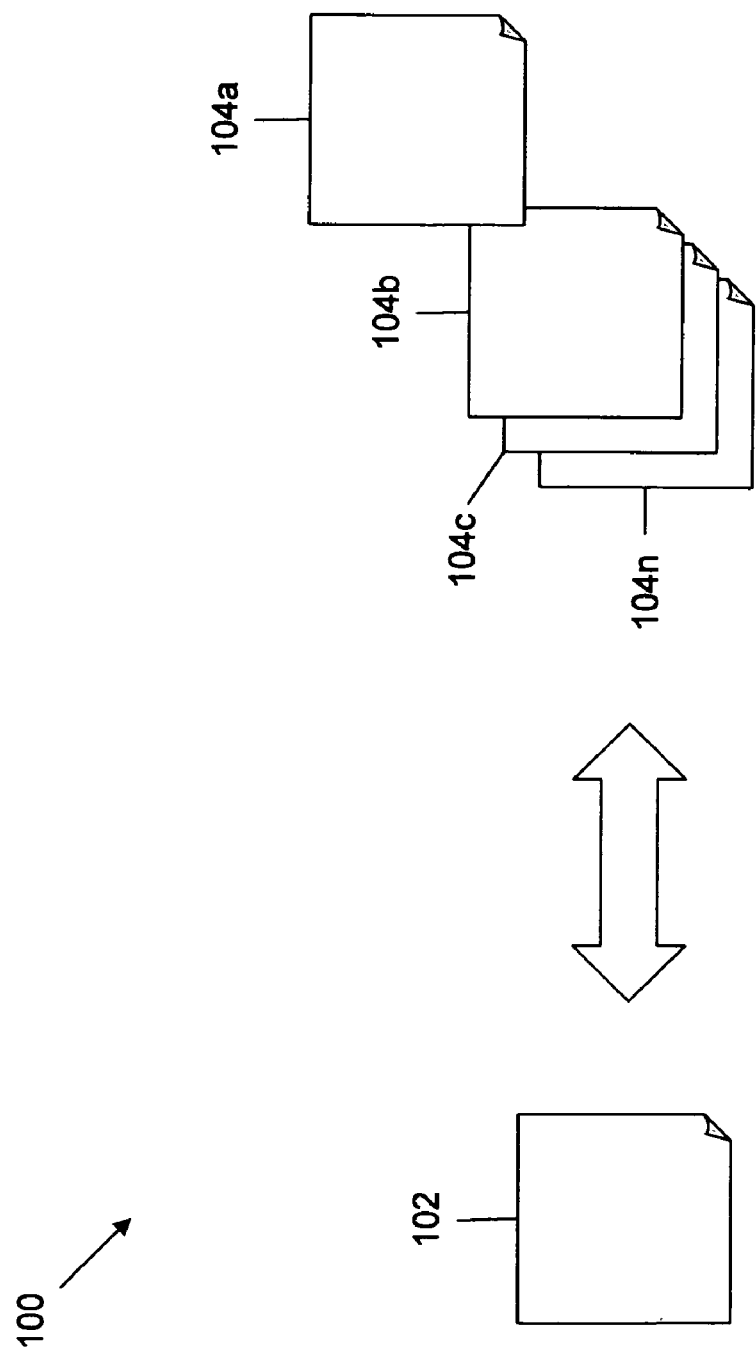
- FIG. 1 illustrates an environment of the image where various embodiments of the present invention can be practiced.

FIG. 1 illustrates an environment 100, where various embodiments of the present invention can be practiced. The present invention may be used in the field of computer vision, object recognition, motion tracking and 3D modeling. The images may be of different formats such as JPEG, GIF, BMP, and the like. Further, the quality and resolution of these images may vary from one application to another. Further, the images need not be exactly the same but a transformed version of each other. Therefore; in the image matching algorithm the image is represented in a particular format so that the images can be matched with each other.

Environment 100 includes a query image 102 and a database of images 104a-n. The database is searched to find an image (or images) that match query image 102. The matching image need not be exactly the same as query image 102, but should contain the same content as query image 102. For example, query image 102 may be a scaled, rotated or zoomed version, or any other possible transformation of the matching image. The image matching algorithm of the present invention finds a match of query image 102 in images 104a-n, which differ in the manner described above. The image matching algorithm operates by representing images in terms of feature points, orientations and feature vectors. After a representation of the query images and database images has been created, the feature points, orientations and feature vectors of the images are used to determine a match between the images. The present invention describes a method and system for representing an image, so that it can be matched with other images.

Figure 2:
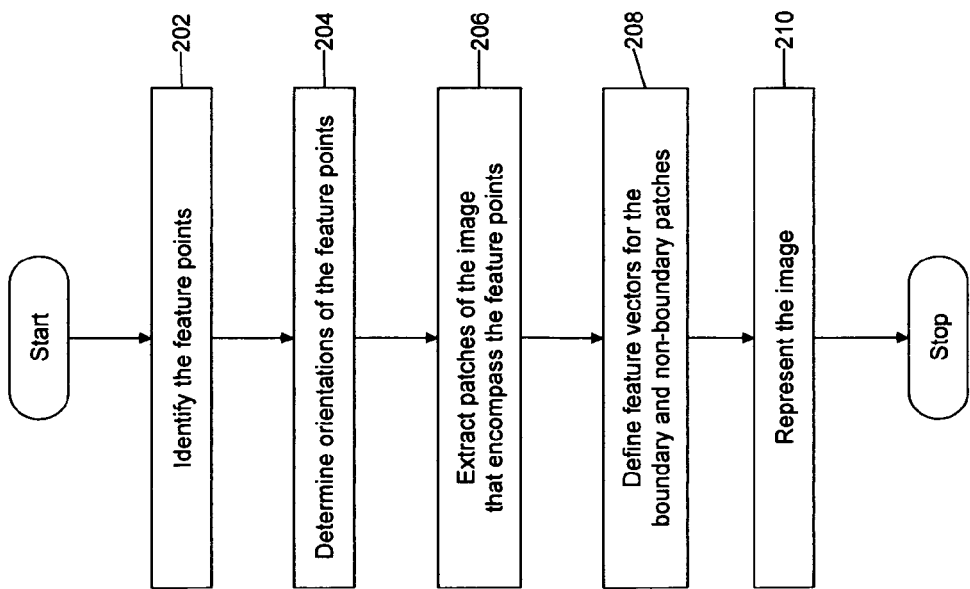
FIG. 2 is a flow diagram illustrating a method for representing an image, in accordance with various embodiments of the present invention.

FIG. 2 is a flowchart illustrating a method for representing an image, in accordance with an embodiment of the present invention. FIG. 2 gives a brief overview of the main steps that should preferably be performed on an image to represent the image. Each step of FIG. 2 is later described in detail in conjunction with FIGS. 3 and 4.

Before representing the image, it is represented as an image pyramid which contains several pyramid images. Pyramid images are smoothed and downsampled versions of the original image. Downsampling is performed by taking every other row and column from the original image. Further, smoothing or blurring of the image is performed by convolving the image with a Gaussian function. The processes of forming the image pyramid by smoothing and downsampling will be described later in detail.

At step 202, the feature points in the pyramid image are identified. The identified feature points are invariant to certain transformations of the image, like zooming, scaling and rotation of the image. The feature points are identified by finding the Harris corner measure at different points in the pyramid image. The local maxima in the Harris corner measure are identified as feature points. After identifying the feature points, their orientations are determined at step 204. The orientations are determined by using a set of orientation calculating algorithms. The orientation calculating algorithms use the gradients of the image to obtain the orientation of the feature points. For example, one algorithm may look for dominant peaks in a histogram of orientations, while another may greatly smooth the image. Thereafter, at step 206, patches of the image which encompass the feature points are extracted around the feature points. The extraction of the patch is based on the orientation of the feature point and a pre-defined sampling factor of the pyramid image. Further, the patches of the feature points that are present on the boundary of the pyramid image are extracted by padding the pyramid image with extra pixels. Thereafter, feature vectors for the boundary and non-boundary patches are defined at step 208. The boundary patches contain extra pixels in the padding of the pyramid image. At step 210, the image is represented based on the feature points, the orientations of the feature points and the feature vectors of the pyramid images.

Before applying the image matching algorithm to the image, the image is represented in the form of an image pyramid. The image pyramid contains several pyramid images. Pyramid images are smoothed and downsampled versions of the original image. Smoothing of the image is performed by convolving the image with a Gaussian function. Therefore, the image pyramid is also referred to as a Gaussian pyramid. The Gaussian function is characterized by a pre-defined scale parameter, denoted by $\sigma$, which is the standard deviation of the Gaussian function. Therefore, all the pyramid images are scaled by a pre-defined scale parameter a, and the value of $\sigma$ varies for each pyramid image.

In an embodiment of the present invention, the Gaussian pyramid consists of several octaves of images. Each octave consists of images that are the same size but different scales. For example, an octave can consist of four images, with the value of $\sigma$ being distributed uniformly among the four images. The values of $\sigma$ for each image in the example above can be 1, $\{\text{fourth root}\}\sqrt{2}$, $(\{\text{fourth root}\}\sqrt{2})^1$, $(\{\text{fourth root}\}\sqrt{2})^3$ and 2. These values of $\sigma$ are only for illustrative purposes, and other values of a can also be used to form the octave. Further, the last image of an octave is downsampled to obtain the first image of the next octave. For example, the last image (with $\sigma=2$) of the example above is downsampled by a factor of 2 to obtain the first image of the next octave. In this case, every other row and column of the image is taken to form the downsampled image. The images are further downsampled to create the octaves until the size of the image falls below a minimum size, such as the size of a patch. In this manner, the whole Gaussian pyramid having several octaves of images is created.

In another embodiment of the present invention, upsampling algorithms are used to increase the size of the image before building the Gaussian pyramid of the image. The images are up-sampled if the initial size of the image is less than an upsampling threshold. For example, the value of the upsampling threshold can be predetermined as 120,000 (400×300). Note that any other value of the upsampling threshold may be chosen in other embodiments, according to different applications of the image matching algorithm. Further, the images are upsampled by inserting a row and column of pixels between every adjacent rows and columns of the original image. The values in the inserted rows and columns are determined by applying bilinear interpolation to the values present in the original image. The upsampling process is performed once and not repeatedly, since upsampling does not create any new information in the image.

In another embodiment of the present invention, when the size of the original image is larger than a downsampling threshold, the images are repeatedly smoothed and downsampled before building the Gaussian pyramid of the image. For example, the downsampling threshold can be predetermined as 1,300,000. Note that any other value of the downsampling threshold may be chosen in other embodiments, according to different applications of the image matching algorithm. The image is smoothed by convolving the image with a Gaussian function whose scale parameter σ is 0.8. Further, the image is downsampled by a factor of 2 by selecting every other row and column from the image to obtain a downsampled image.

Figure 3:
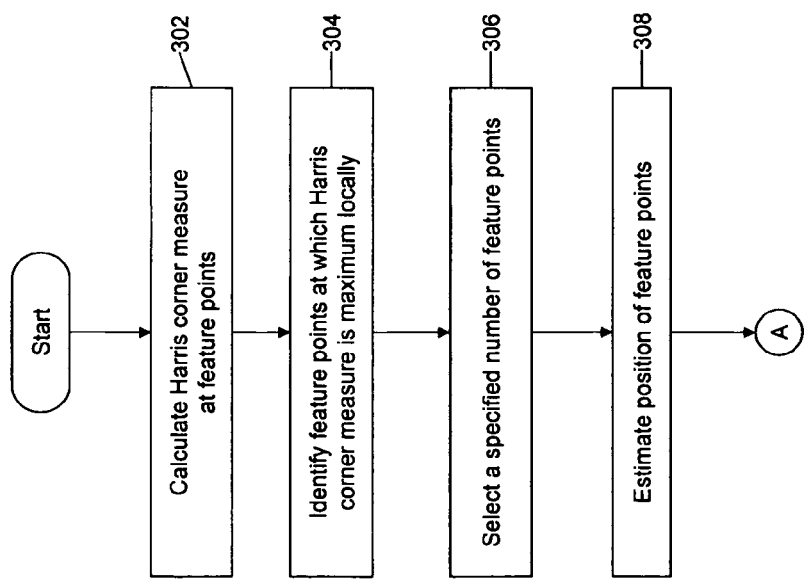
FIGS. 3 and 4 represent a flow diagram illustrating a detailed method for representing an image, in accordance with an embodiment of the present invention.
Figure 4:
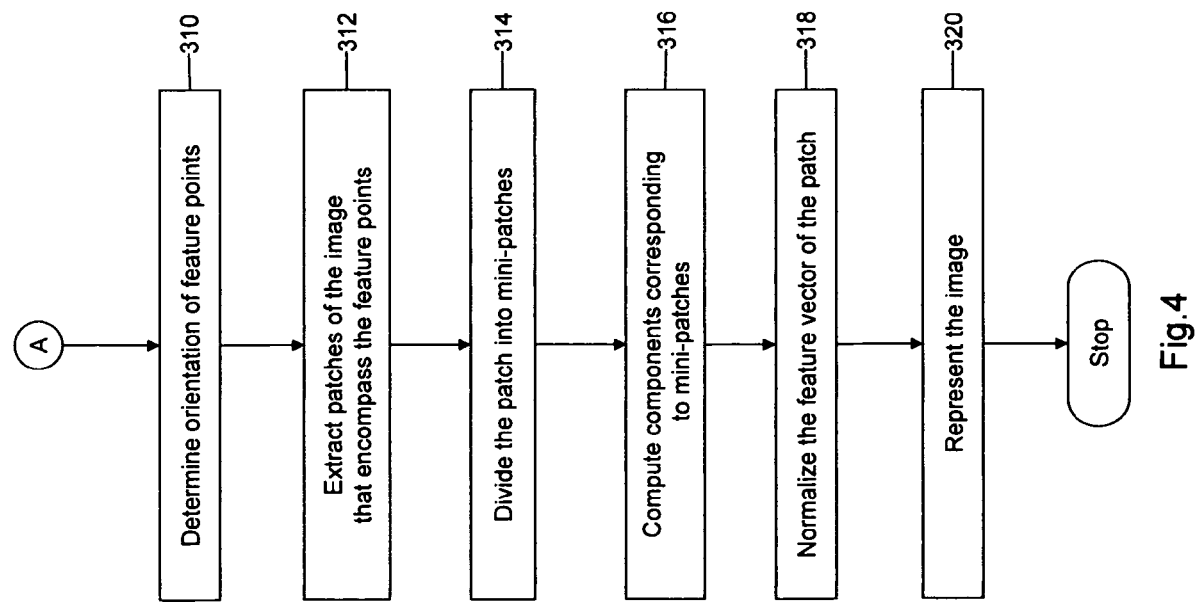

After representing the image in the form of the image pyramid, the image is represented in the form of feature points, feature point orientations and feature vectors. FIGS. 3 and 4 represent a flowchart that illustrates a detailed method for representing an image. Steps 302-320 of FIGS. 3 and 4 are performed separately on the pyramid images of the Gaussian pyramid. However, for the sake of brevity, the term 'image', instead of the term 'pyramid image', has been used while representing the steps of FIGS. 3 and 4.

The first step in the overall process of representing the image is to identify the feature points in the image, as stated in step 202 of FIG. 2. Feature points are a set of "interesting points" used to represent the image. The process of identifying the feature points is further explained in detail.

To identify the feature points in the image, the 'interestingness' of feature points in the image is calculated. The 'interestingness' of a feature point in the image is defined in terms of the Harris corner measure of feature points in the image. These feature points can be present in the main region of the image or on the edges of the image. The Harris corner measure is calculated at step 302. It is based on the autocorrelation function of the image. To obtain the Harris corner measure, the image gradient is calculated from $I_x$ and $I_y$, the derivatives of the image in the x-direction and the y-direction, respectively. These derivatives are obtained by convolving the image with a kernel such as [−1 0 1] in the x-direction and in the y-direction.

The derivatives of the image are used to represent the approximate amount of shift in intensity at any point (x, y) of the image. The feature points are identified based on the shift in intensity at the features in the image. The shift in intensity at a point (x, y) is denoted by E(x, y) and represented by the relation:

$$E(x, y) = [x \ y] M \begin{bmatrix} x \\ y \end{bmatrix}, \text{ where } M = \begin{bmatrix} I_x^2 & I_{xy} \\ I_{xy} & I_y^2 \end{bmatrix}.$$

The eigenvalues of the matrix M define the nature of the region of the image that surrounds the point (x, y). If both eigenvalues are small, it indicates that the region is flat and no variations are present in the region. If exactly one eigenvalue is large, it indicates that the region contains an edge. If both eigenvalues are large, it indicates that the region contains a corner or junction. The eigenvalues are not determined directly since their calculation is a complex process. To avoid computing the eigenvalues, the determinant and trace of the matrix M are calculated. The determinant det(M) and trace trace(M) yield the product and sum of the eigenvalues. Thereafter, the Harris corner measure (H) at the point (x,y) is defined as:

$$H = \det(M)/\text{trace}(M) = (I_x^2 * I_y^2 - I_{xy}^2)/(I_x^2 + I_y^2).$$

To keep this function defined at all times, a small quantity ϵ is added to the denominator so that it is always non-zero. Further, the elements of the matrix M ($I_x^2$, $I_y^2$, $I_{xy}$) at a point are obtained by convolving the image gradients with a Gaussian function. Following are the expressions to calculate these elements:

$$I_x^2 = (I_x * I_x) \circ G_\sigma,$$

$$I_{xy} = (I_x * I_y) \circ G_\sigma,$$

$$I_y^2 = (I_y * I_y) \circ G_\sigma,$$

where $G_\sigma$ denotes the Gaussian function and is characterized by the scale parameter σ. Since multiplication is a non-linear function, convolution with the Gaussian function is performed after the multiplication.

After calculation of the Harris corner measure at the points in the image, the feature points are identified at step 304 as points in the image where the Harris corner measure has local maxima. The method for determining the local maxima of the Harris corner measure is explained below in detail.

In an embodiment of the present invention, a 5×5 box is used to check whether a pixel in the image is a local maximum. The 5×5 box has a radius of 2, where the radius is the radius of an imaginary circle drawn with the center taken as the center of the 5×5 box. Note that any other suitable size may be chosen to determine the maxima. The center of the box is aligned with the feature point, and the Harris corner of the points lying within the box is compared with the Harris corner measure of the center point. The center point is a local maximum if its Harris corner measure is greater than the Harris corner measure of every other point within the box. When a point is identified as a local maximum, it is added to the set of feature points. The size or radius of the box used to detect the local maximum can vary. However, a box with a radius greater than one is generally used, since it prevents the feature points from being too close.

After identifying the set of feature points based on the Harris corner measure, a specified number of feature points are selected from the set of feature points at step 306. The selection becomes important when the image is at a high resolution or it contains a large amount of text. Such images can produce a large number of feature points, which can reduce the efficiency of the image matching algorithm. In an embodiment of the present invention, the specified number of feature points is selected based on the Harris corner measure of the feature points. In this event, the feature points are sorted in descending order of their Harris corner measure to form a list, and a specified number of feature points are selected from the top of the list. In another embodiment of the present invention, the selection of feature points can be based on the product of the Harris corner measure and the pre-defined scale parameter of the pyramid image.

At step 308, a more refined position of feature points is estimated. The feature points identified at step 306 have integer coordinates. However, the pixels in the image are discrete samples of the image function. Further, one pixel in the down-sampled images represents a 2×2, 4×4 or 8×8 block of pixels in the original image. For these reasons, a more precise position of the feature points is estimated at a subpixel level. This process is referred to as subpixel localization.

The subpixel localization of a feature point is performed by fitting an elliptic paraboloid to a pre-defined region around the feature point. The elliptic paraboloid is fitted in such a manner that it encompasses the feature point and the value of the intensity present on those feature points. An elliptic paraboloid is a three-dimensional quadratic surface with an elliptical cross section. The pre-defined region to which the elliptic paraboloid is fitted encompasses the feature point. In an embodiment of the present invention, the pre-defined region is a 3×3 box of pixels that is centered at the feature point. The values in the 3×3 box are used to determine the coefficients of the elliptic paraboloid, from which the position of the vertex of the elliptic paraboloid is determined. The vertex represents the subpixel position of the feature point. The process of fitting an elliptic paraboloid and finding the vertex of the elliptic paraboloid is further explained in detail.

The equation of an elliptic paraboloid is: $z(x, y)=ax^2+by^2+cxy+dx+ey+f$, where a and b have the same sign, and where a, b, c, d, e, f are coefficients of the equation. These coefficients are generated at runtime and vary from patch to patch. The coordinates of the vertex of this elliptic paraboloid can be determined by setting the partial derivatives of the elliptic paraboloid to zero, by using the following equations:

$$\frac{dz}{dx} = 2ax + cy + d = 0, \text{ and}$$

$$\frac{dz}{dy} = 2by + cx + e = 0.$$

The equations above are solved to obtain the x- and y-coordinates of the vertex of the elliptic paraboloid. The values of x and y are obtained as follows:

$$x = \frac{ce - 2bd}{4ab - c^2},$$

$$y = \frac{cd - 2ae}{4ab - c^2},$$

where $4ab - c^2 \neq 0$.

There can be instances in which the pre-defined region around the feature point is not approximated effectively by the elliptic paraboloid. This is determined by checking the x- and y-coordinates of the vertex. If the subpixel coordinates are greater than 1 pixel away from the center pixel, the subpixel coordinates are discarded and the integral coordinates of the feature point are used.

To determine the subpixel x- and y-coordinates of the vertex of the elliptic paraboloid, the six coefficients of the elliptic paraboloid are determined. Since the 3×3 box provides nine constraints, a least squares fit is applied to determine the coefficients. The nine constraints can be represented together as Ax=b and have the following form:

$$\begin{bmatrix} x_1^2 & y_1^2 & x_1 y_1 & x_1 & y_1 & 1 \\ x_2^2 & y_2^2 & x_2 y_2 & x_2 & y_2 & 1 \\ \cdots & \cdots & \cdots & \cdots & \cdots & \cdots \\ \cdots & \cdots & \cdots & \cdots & \cdots & \cdots \\ x_9^2 & y_9^2 & x_9 y_9 & x_9 & y_9 & 1 \end{bmatrix} \begin{bmatrix} a \\ b \\ c \\ d \\ e \\ f \end{bmatrix} = \begin{bmatrix} z_1 \\ z_2 \\ \cdots \\ \cdots \\ z_9 \end{bmatrix},$$

where $x_i$ and $y_i$ are the coordinates of the pixels present in the 3×3 box. The coordinates $x_i$ and $y_i$ are relative to the center of the box, and actual coordinates can be obtained by adding the absolute coordinates of the center of the box to $x_i$ and $y_i$. After replacing the values of $x_i$ and $y_i$ in the equation above, the following matrix equation is obtained:

$$\begin{bmatrix} 1 & 1 & 1 & -1 & -1 & 1 \\ 0 & 1 & 0 & 0 & -1 & 1 \\ 1 & 1 & -1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & 1 & -1 & -1 & 1 & 1 \\ 0 & 1 & 0 & 0 & 1 & 1 \\ 1 & 1 & 1 & 1 & 1 & 1 \end{bmatrix} \begin{bmatrix} a \\ b \\ c \\ d \\ e \\ f \end{bmatrix} = \begin{bmatrix} z(-1,-1) \\ z(0,-1) \\ z(1,-1) \\ z(-1,0) \\ z(0,0) \\ z(1,0) \\ z(-1,-1) \\ z(0,1) \\ z(1,1) \end{bmatrix}.$$

To solve the matrix equation above, the following formula can be used: $x=(A^T A)^{-1} A^T b = A^* b$. The matrix $A^*$ can be calculated since the A matrix is known:

$$A^* = \frac{1}{36} \begin{bmatrix} 6 & -12 & 6 & 6 & -12 & 6 & 6 & -12 & 6 \\ 6 & 6 & 6 & -12 & -12 & -12 & 6 & 6 & 6 \\ 9 & 0 & -9 & 0 & 0 & 0 & -9 & 0 & 9 \\ -6 & 0 & 6 & -6 & 0 & 6 & -6 & 0 & 6 \\ -6 & -6 & -6 & 0 & 0 & 0 & 6 & 6 & 6 \\ -4 & 8 & -4 & 8 & 20 & 8 & -4 & 8 & -4 \end{bmatrix}.$$

The matrix $A^*$ is used to compute the coefficients of the elliptic paraboloid. Thereafter, the coefficients are used to compute the coordinates of the vertex of the elliptic paraboloid.

After computing the subpixel location of the feature points, the orientations of the feature points are determined at step 310. The orientations of the feature points enable the image matching algorithm to match rotated versions of the same image. Feature points may have more than one orientation associated with them. A set of orientations of feature points is calculated using a set of orientation calculating algorithms.

The first orientation calculating algorithm uses an interpolated gradient method for determining the orientation. In this method, the image derivatives $I_x$ and $I_y$ are interpolated at the subpixel location calculated at step 308. Thereafter, the four-quadrant arctangent is computed at the subpixel location to compute the orientation.

The second orientation calculating algorithm calculates the orientation by performing a smoothing operation on the image. The smoothing operation can be performed by using a Gaussian function. In an embodiment of the present invention, the scale parameter of the Gaussian function is five. Thereafter, the interpolated gradient image method, as described by the first orientation calculating algorithm, is applied to the smoothed image to obtain the orientation. Due to the smoothing operation, the spatial coverage of this method is roughly equal to the patch size.

The third orientation calculating algorithm calculates the orientation by forming an orientation histogram. The orientation histogram has 36 bins that cover the 360 degree range of orientations. Therefore, a bin has a width of 10 degrees. A patch is selected around the feature point and a Gaussian weight is applied to the entire patch. Thereafter, the image gradient at each point in the patch is mapped to its corresponding bin in the orientation histogram. The contribution of the image gradient to the bin is equal to the product of the gradient magnitude and the Gaussian weight at that point. Once the entire orientation histogram is completed for the feature point, the highest peak in the histogram and other peaks that are at least 85 percent as high as the highest peak are identified. These peaks represent dominant values of the orientations at the feature point. Therefore, the orientation histogram method can result in multiple orientations per feature point. Further, each peak value in the histogram is localized to determine an accurate value of the peak. The localization of each peak is performed by fitting a parabola to a set of histogram values that are close to each peak.

Any of the three methods mentioned above can be used to determine the orientation of the feature points. However, there can be an event when two or all three of the methods are used for determining the orientation. In this event, multiple values of orientations are obtained for a single feature point. Some of these orientations may be close to each other. The groups of orientations that are within a pre-defined angular distance of each other are replaced by the mean of the group of orientations. In an embodiment of the present invention, if two or more orientations are within a range of 20 degrees from each other, these two or more orientations are replaced with a single orientation, which is equal to the mean of the two or more orientations. The angular wraparound is considered when the 20-degree range encompasses the 360-degree orientation.

After determining the feature points and their orientations, patches of the image which encompass the feature points are extracted around the feature points at step 312. Patches are extracted from the image gradient and it encompasses its corresponding feature point. More specifically, the feature point is located at the center of the patch, and the size of the patch is 16×16. This is an exemplary value of the patch and any other suitable value can also be used. The patch is extracted by sampling the gradient based on the orientations of the feature point and the pre-defined sampling factor of the image. The gradient is sampled at a plurality of determined positions, which are determined based on the orientation of the feature point and the pre-defined sampling factor. More specifically, the orientation of the feature point determines a coordinate reference frame, for example by choosing the positive x-axis to be in the direction of the orientation of the patch. The spacing between the samples of gradient images is equal to the value of the pre-defined sampling factor, which is equal to its position in the octave. For instance, if the intermediate scale relative to the octave is {fourth root}$\sqrt{2}$, the samples will be 1.19 pixels apart.

When the feature points lie close to the boundary of the image, a portion of the patch may lie outside the boundary of the image. To include the contribution of such feature points in the representation of the image, the image is padded with extra white pixels along the boundary of the image. Note that white is an exemplary color and that other colors may be used.

After extracting the patch around the feature point, a feature vector is defined for the patch. To define the feature vector, the patch is divided into several mini-patches at step 314. In an embodiment of the present invention, the patch is divided into a 4×4 grid of mini-patches, each of which is 4×4 pixels in size. The division of the patch is performed to represent the relative locations of different parts of the patch in an accurate manner. Thereafter, the components corresponding to the mini-patches are extracted at step 316. Each mini-patch has four components. Each of the four components is computed from the image gradients present in the corresponding mini-patch. The first component is the sum of all positive x-derivatives present in the mini-patch of the image. The second component is the negative of the sum of all negative x-derivatives present in the mini-patch of the image. The third component is the sum of all positive y-derivatives present in the mini-patch of the image. The fourth component is the negative of the sum of all negative y-derivatives present in the mini-patch of the image. The four components can be represented as:

$$\left[ \sum_{I_x>0} I_x - \sum_{I_x<0} I_x \sum_{I_y>0} I_y - \sum_{I_y<0} I_y \right]$$

These four components are then concatenated together across mini-patches to define a single 64-dimensional feature vector corresponding to a feature point.

After obtaining the feature vector of the feature point, the feature vector is normalized at step 318. The normalization is performed to prevent some high-value components of the feature vector from dominating the entire feature vector. There may be a situation when a high-contrast edge is present in the patch around the feature point. In this case, the feature vector will have a few components with large values. Such feature vectors will be less robust for image matching because the small components are ignored when the few large components are present. It will also be sensitive to overall changes in contrast.

The present invention in one embodiment uses an iterative procedure, which has a fast convergence rate, to normalize the feature vector of the patch. In the first step of the iterative procedure, all the components whose values are above a pre-defined threshold are reduced to the pre-defined threshold. In the second step, the components whose values are less than the pre-defined threshold are normalized to a calculated length. The calculated length is determined based on the pre-defined threshold and the number of components that have values equal to the pre-defined threshold after the first step has been performed. In an embodiment of the present invention, the calculated length is equal $\sqrt{1-nt^2}$, where t is the pre-defined threshold and n is the number of components at the pre-defined threshold value. The value of the pre-defined threshold may be chosen according to the requirement of the particular application. Note that the second step ensures that the entire feature vector is of unit length. Further, the first and second steps are repeated until all the components are less than or equal to the pre-defined threshold. This requirement is desirable when compressing floating-point values to single bytes effectively.

The steps mentioned above for determining the feature points, the orientations and the feature vector are performed on the pyramid image. Therefore, feature points on preferably each pyramid image are identified and their orientations and feature vectors are calculated. At step 320, the image is represented based on the feature points, orientations and feature vectors of the pyramid images.

Figure 5:
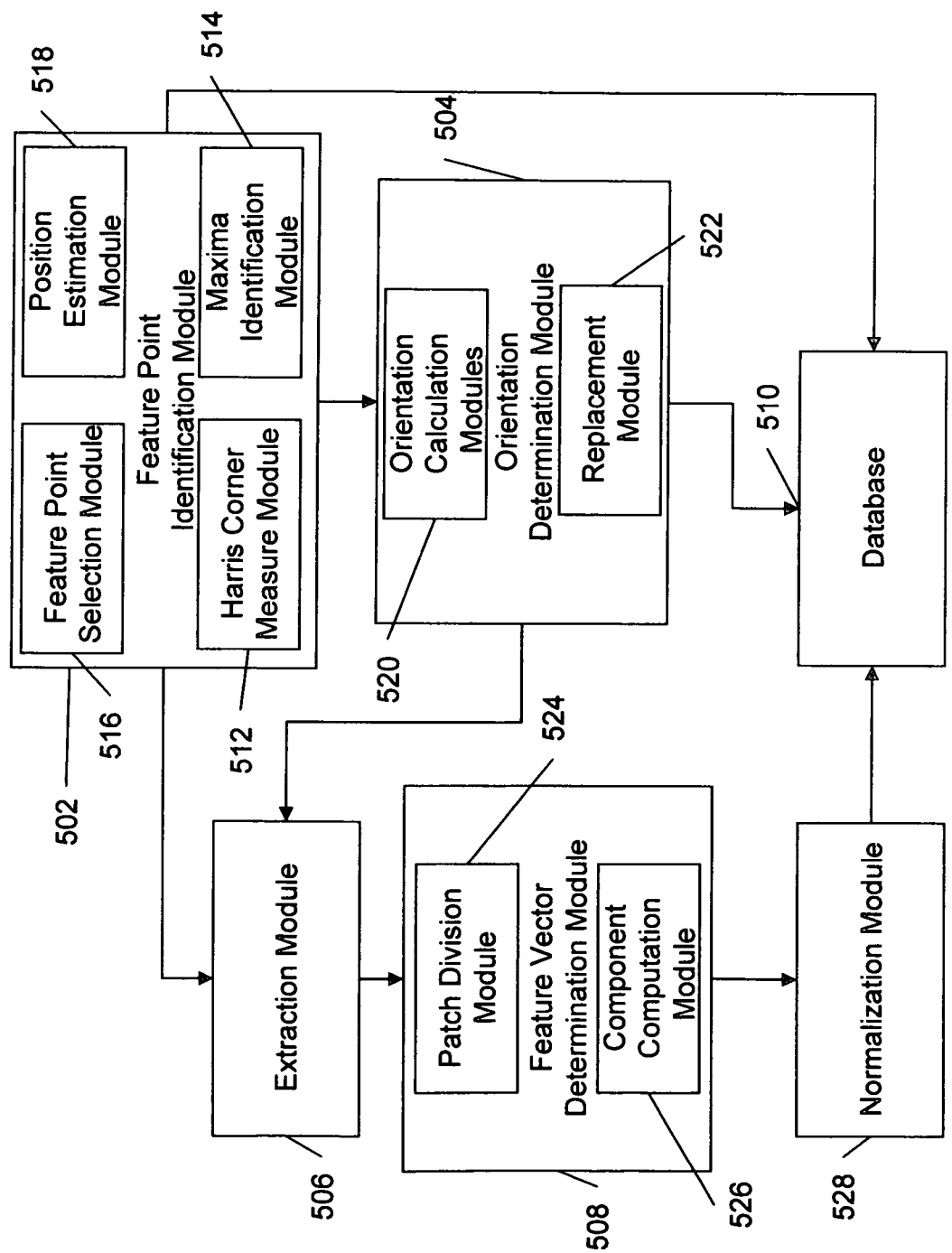
FIG. 5 is a block diagram illustrating various system components that will be used to represent an image, in accordance with various embodiments of the present invention.

FIG. 5 is a block diagram that illustrates the elements of the system used to represent the image, in accordance with various embodiments of the present invention. The system can be used to represent the image in numerous image matching scenarios. The system takes an image as an input and generates a representation of the image that facilitates matching the image with other images. FIG. 5 includes a Feature Point Identification Module (FPIM) 502, an Orientation Determination Module (ODM) 504, an Extraction Module (EM) 506, a Feature Vector Determination Module (FVDM) 508 and a Database (DB) 510. FPIM 502 is used to identify the feature points in the image. ODM 504 and EM 506 use these feature points to determine the orientations of the feature points and extract patches around these feature points, respectively. FVDM 508 uses the patches extracted by EM 506 to determine feature vectors corresponding to these patches. Further, DB 510 is used to store all the feature points, their orientations and the feature vectors.

FPIM 502 is used to identify the feature points in the image. FPIM 502 includes a Harris Corner Measure Module (HCMM) 512 and a Maxima Identification Module (MIM) 514. The HCMM is used to calculate the Harris corner measure at each point in the image. The Harris corner measure represents the 'interestingness' of the points, and is calculated as described in step 302 of FIG. 3. Further, the MIM 514 is used to identify a set of points at which the Harris corner measure, as calculated by the HCMM, has local maxima. The local maxima of the Harris corner measure is identified as described in step 304 of FIG. 3. The set of points that have local maxima are identified as the feature points of the image.

After identifying the feature points, a Feature Point Selection Module (FPSM) 516 is used to select a specified number of feature points from the feature points identified by FPIM 502. The FPSM selects the feature points as described in step 306 of FIG. 3. Further, a Position Estimation Module (PEM) 518 is used to estimates the position of the selected feature points. The PEM estimates the position of the feature points by fitting an elliptic paraboloid to a pre-defined region which encompasses the feature points. The PEM estimates the position of the feature points as described in step 308 of FIG. 3.

ODM 504 takes the feature points identified by FPIM 502 as input and determines the orientations of the feature points, as described in step 310 of FIG. 4. The orientations are determined based on a set of orientation calculating algorithms. ODM 504 includes a set of orientation calculation modules 520. Each orientation calculating module computes the orientations of the feature points by using a corresponding orientation calculating algorithm. ODM 504 also includes a replacement module 522 to replace the group of orientations that lie within a pre-defined angular distance with the mean of the group of orientations.

EM 506 takes a pyramid image and the feature points identified by FPIM 502, each with its corresponding orientation(s) identified by ODM 504, as input. EM 506 extracts the patch around the feature point as described in step 312 of FIG. 4. Further, EM 506 extracts the patches present at the boundary of the image by padding the image with extra pixels.

The patches extracted by EM 506 are used by FVDM 508 to define feature vectors corresponding to the patches. FVDM 508 includes a Patch Division Module (PDM) 524 and a Component Computation Module (CCM) 526. The PDM is used to divide the patch into several mini-patches as described in step 314 of FIG. 4. Thereafter, the CCM computes the components of the feature vectors corresponding to the mini-patches generated by the PDM. The CCM computes the components as described in step 316 of FIG. 4.

The feature vectors defined by FVDM 508 are normalized by a normalization module 528. The normalization is performed to prevent some high-value components of the feature vector from dominating the entire feature vector. The normalization module 528 normalizes the feature vectors as described in step 318 of FIG. 4.

The feature points and the feature vectors of the pyramid images obtained as an output of FPIM 502, ODM 504 and FVDM 508 are stored in DB 510. These feature points and feature vectors are collectively used to represent the image and to match several images with each other.

In accordance with various embodiments of the present invention, the present invention provides a method for effectively representing an image. The method intelligently chooses a specific number of feature points if a large number of feature points are present in the image. Therefore, images with too many feature points can also be described using the method of the current invention. Further, the method intelligently combines the orientations of the feature points to remove unnecessary orientations of the feature points. The removal of unnecessary orientations reduces the complexity of the overall method. Furthermore, the patches extracted around the feature points are sampled based on the orientations of the feature point and the sampling factor of the image. This kind of sampling corrects for scale changes when the size of the image does not change between scales. Moreover, the method also takes into account the boundary patches of the image while representing the image. The inclusion of boundary patches results in a more accurate and complete representation of the image. The method also ensures that the components of the feature vectors used to define a patch are not very large. Therefore, all the components of the feature vector have a significant contribution in image representation.

The system for representing the image, as described in the present invention or any of its components, may be embodied in the form of a computer program product for use with a computer system. The computer program product has a computer-usable medium having a computer-readable code embodied therein, to represent the image. Typical examples of a computer system include a general-purpose computer, a programmed microprocessor, a micro-controller, a peripheral integrated circuit element, and other devices or arrangements of devices capable of implementing the steps that constitute the method of the present invention.

The computer system typically comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as a floppy disk drive, an optical disk drive, and the like. The storage device may also be other similar means of loading computer programs or other instructions into the computer system. The computer system also includes a communication unit. The communication unit enables the computer to connect to other databases and the Internet through an Input/Output (I/O) interface, enabling transfer and reception of data from other databases. The communication unit may include a modem, an Ethernet card or any other similar device which enables the computer system to connect to databases and networks such as LAN, MAN, WAN and the Internet. The computer system facilitates inputs from a user through an input device, accessible to the system through an I/O interface.

The computer system executes a set of instructions stored in one or more storage elements to process input data. The storage elements may also hold data or other information as desired. The storage element may be in the form of an information source or a physical memory element present in the processing machine.

The programmable instructions may include various commands that instruct the processing machine to perform specific tasks such as the steps that constitute the method of the present invention. The method and systems described can also be implemented using only software programming or hardware or by a varying combination of the two techniques. The present invention is independent of the programming language used and the operating system in the computers. The instructions for the invention can be written in all programming languages including, but not limited to, 'C', 'C++', 'Visual C++' and 'Visual Basic'. Further, the software may be in the form of a collection of separate programs, a program module with a large program, or a portion of a program module, as described in the present invention. The software may also include modular programming in the form of object-oriented programming. The processing of input data by the processing machine may be in response to user commands, results of previous processing or a request made by another processing machine. The invention can also be implemented in all operating systems and platforms including, but not limited to, 'Unix', 'DOS', and 'Linux'.

The programmable instructions can be stored and transmitted on computer-readable medium. The programmable instructions can also be transmitted by data signals across a carrier wave. The present invention can also be embodied in a computer program product comprising a computer-readable medium, the product capable of implementing the methods and systems above, or the numerous possible variations thereof.

While various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for representing an image, the image being represented as a Gaussian pyramid, the Gaussian pyramid comprising a plurality of pyramid images, each of the plurality of pyramid images comprising a plurality of pixels, the method comprising:
    identifying a plurality of feature points in at least one of the plurality of pyramid images;
    determining one or more orientations of each of the plurality of feature points in the at least one of the plurality of pyramid images based at least in part on two or more of a set of orientation calculating algorithms;
    extracting one or more patches encompassing each of the plurality of feature points from the at least one of the plurality of pyramid images based at least in part on the one or more orientations and a pre-defined sampling factor of the at least one of the pyramid images;
    defining one or more feature vectors for each of the one or more patches; and
    representing the image based at least in part on the plurality of feature points and the one or more feature vectors of the at least one of the plurality of pyramid images.

2. The method of claim 1, wherein a patch for the plurality of feature points present on a boundary of the at least one of the plurality of pyramid images is extracted by padding the at least one of the plurality of pyramid images with extra pixels.

3. The method of claim 1, wherein the at least one of the plurality of pyramid images is formed by downsampling the image and blurring the image by a Gaussian function, the Gaussian function being characterized by a pre-defined scale parameter.

4. The method of claim 1, wherein identifying the plurality of feature points of the at least one of the pyramid images comprises:
    calculating a Harris corner measure at one or more of the plurality of pixels of the at least one of the pyramid images; and
    identifying a set of points at which the Harris corner measure has a local maxima among the one or more of the plurality of pixels.

5. The method of claim 4 further comprising selecting a specified number of the plurality of feature points based at least in part on a combination of the Harris corner measure of the one or more of the plurality of pixels and a pre-defined scale parameter of the at least one of the plurality of pyramid images.

6. The method of claim 4 further comprising estimating a position of each of the plurality of feature points by fitting an elliptic paraboloid to a pre-defined region, the pre-defined region encompassing the each of the plurality of feature points.

7. The method of claim 1, wherein determining the one or more orientations of the plurality of feature points in the at least one of the plurality of pyramid images comprises:
    calculating a set of orientations for each of the plurality of feature points by using the set of orientation calculating algorithms; and
    replacing a subset of the set of orientations within a pre-defined angular distance of each other with a mean of the subset.

8. The method of claim 1, wherein extracting the one more patches encompassing each of the plurality of feature points from the at least one of the plurality of pyramid images comprises sampling gradients of the at least one of the plurality of pyramid images at a plurality of determined positions, the plurality of determined positions being determined based at least in part on the one or more orientations and the pre-defined sampling factor of the at least one of the plurality of pyramid images.

9. The method of claim 1, wherein defining the one or more feature vectors for each of the one or more patches comprises:
    dividing each of the one or more patches into a plurality of mini-patches; and
    computing components of each of the one or more feature vectors corresponding to a mini-patch of the plurality of mini-patches.

10. The method of claim 9, wherein the components of the one or more feature vectors corresponding to the mini-patch comprise:
    a first component, the first component being a sum of all positive x-derivatives of the at least one of the plurality of pyramid images present in the mini-patch;
    a second component, the second component being the negative of a sum of all negative x-derivatives of the at least one of the plurality of pyramid images present in the mini-patch;
    a third component, the third component being a sum of all positive y-derivatives of the at least one of the plurality of pyramid images present in the mini-patch; and a fourth component, the fourth component being the negative of a sum of all negative y-derivatives of the at least one of the plurality of pyramid images present in the mini-patch.

11. The method of-claim 1 further comprising normalizing the one or more feature vectors of each the one or more patches.

12. The method according to claim 11, wherein normalizing the one or more feature vectors comprises:
   determining components of an initial feature vector having values less than a pre-defined threshold; and
   normalizing the components having values less than the pre-determined threshold to a calculated length.

13. The method of claim 12, wherein the calculated length is calculated based at least in part on the pre-defined threshold and a number of the components having values greater than the pre-defined threshold.

14. The method of claim 13, wherein the steps of determining the components of the initial feature vector and normalizing the components having values less than the pre-determined threshold are repeated until no component has a value greater than the pre-defined threshold.

15. A system for representing an image, the image being represented as a Gaussian pyramid, the Gaussian pyramid comprising a plurality of pyramid images, each of the plurality of pyramid images comprising a plurality of pixels, the system comprising:
   a feature point identification module for identifying a plurality of feature points in at least one of the plurality of pyramid images;
   an orientation determination module for determining one or more orientations of each the plurality of feature points in the at least one of the plurality of pyramid images, wherein the one or more orientations are determined based at least in part on two or more of a set of orientation calculating algorithms;
   an extraction module for extracting one or more patches encompassing each of the plurality of feature points from the at least one of the plurality of pyramid images based at least in part on the one or more orientations and a pre-defined sampling factor of the at least one of the pyramid images;
   a feature vector determination module, the feature vector determination module being configured to define one or more feature vectors for each of the one or more patches; and
   a database for storing the plurality of feature points and the one or more feature vectors of the at least one of the plurality of pyramid images.

16. The system of claim 15, wherein a patch for the plurality of feature points present on the boundary of the at least one of the plurality of pyramid images is extracted by padding the at least one of the plurality of pyramid images with extra pixels.

17. The system of claim 15, wherein the feature point identification module comprises:
   a Harris corner measure module for calculating a Harris corner measure at one or more of the plurality of pixels of the at least one of the pyramid images; and
   a maxima identification module for identifying a set of points at which the Harris corner measure calculated by the Harris corner measure module has a local maxima among the one or more of the plurality of pixels.

18. The system of claim 17 further comprising a feature point selection module for selecting a specified number of the plurality of feature points based at least in part on a combination of the Harris corner measure of the one or more of the plurality of pixels and a pre-defined scale parameter of at least one of the plurality of pyramid images.

19. The system of claim 15 further comprising a position estimation module for estimating a position of each of the plurality of feature points by fitting an elliptic paraboloid to a pre-defined region, the pre-defined region encompassing the each of the plurality of feature points.

20. The system of claim 15, wherein the orientation determination module comprises:
   a set of orientation calculation modules for calculating a set of orientations for each of a feature plurality of points; and
   a replacement module for replacing a subset of the set of orientations within a pre-defined angular distance of each other with the mean of the subset.

21. The system of claim 15, wherein the feature vector determination module comprises:
   a patch division module for dividing each of the one or more patches into a plurality of mini-patches; and
   a component computation module for computing components of each of the one or more feature vectors corresponding to a mini-patches of the plurality of mini-patches.

22. The system of claim 15 further comprising a normalization module for normalizing the one or more feature vectors of each of the one or more patches.

23. A computer program product for use with a computer, the computer program product comprising a set of instructions stored in a non-transitory computer-usable medium having a computer-readable program code embodied therein for representing an image, the image being represented as a Gaussian pyramid, the Gaussian pyramid comprising a plurality of pyramid images, each of the plurality of pyramid images comprising a plurality of pixels, the computer-readable program code performing:
   identifying a plurality of feature points in at least one of the plurality of pyramid images;
   determining one or more orientations of each of the plurality of feature point in the at least one of the plurality of pyramid images based at least in part on two or more of a set of orientation calculating algorithms;
   extracting one or more patches encompassing each of the plurality of feature points from the at least one of the plurality of pyramid images based at least in part on the one or more orientations and a pre-defined sampling factor of the at least one of the pyramid images;
   defining one or more a feature vectors for each of the one or more patches; and
   representing the image based at least in part on the plurality of feature points and the one or more feature vectors of the at least one of the plurality of pyramid images.

24. The computer program product of claim 23, wherein a patch for the plurality of feature points present on a boundary of the at least one of the plurality of pyramid images is extracted by padding the at least one of the plurality of pyramid images with extra pixels.

25. The computer program product of claim 23, wherein the at least one of the plurality of pyramid images is formed by downsampling the image and blurring the image by a Gaussian function, the Gaussian function being characterized by a pre-defined scale parameter.

26. The computer program product of claim 23, wherein identifying the plurality of feature points of the at least one of the pyramid images comprises:
   calculating a Harris corner measure at one or more of the plurality of pixels of the at least one of the pyramid images; and identifying a set of points at which the Harris corner measure has a local maxima among the one or more of the plurality of pixels.

27. The computer program product of claim 26, wherein identifying the plurality of feature points of the at least one of the pyramid images further comprises selecting a specified number of the plurality of feature points based at least in part on a combination of the Harris corner measure of the one or more of the plurality of pixels and a pre-defined scale parameter of the at least one of the plurality of pyramid images.

28. The computer program product of claim 26, wherein identifying the plurality of feature points of the at least one of the pyramid images further comprises estimating a position of each of the plurality of feature points by fitting an elliptic paraboloid to a pre-defined region, the pre-defined region encompassing the each of the plurality of feature points.

29. The computer program product of claim 23, wherein determining the one or more orientations of the plurality of feature points in the at least one of the plurality of pyramid images comprises:
   calculating a set of orientations for each of the plurality of feature points by using the set of orientation calculating algorithms; and
   replacing a subset of the set of orientations within a pre-defined angular distance of each other with a mean of the subset.

30. The computer program product of claim 23, wherein extracting the one more patches encompassing each of the plurality of feature points from the at least one of the plurality of pyramid images comprises sampling gradients of the at least one of the plurality of pyramid images at a plurality of determined positions, the plurality of determined positions being determined based at least in part on the one or more orientations and the pre-defined sampling factor of the at least one of the plurality of pyramid images.

31. The computer program product of claim 23, wherein defining the one or more feature vectors for each of the one or more patches comprises:
   dividing each of the one or more patches into a plurality of mini-patches; and
   computing components of each of the one or more feature vectors corresponding to a mini-patch of the plurality of mini-patches.

32. The computer program product of claim 31, wherein the components of the one or more feature vectors corresponding to the mini-patch comprise:
   a first component, the first component being a sum of all positive x-derivatives of the at least one of the plurality of pyramid images present in the mini-patch;
   a second component, the second component being the negative of a sum of all negative x-derivatives of the at least one of the plurality of pyramid images present in the mini-patch;
   a third component, the third component being a sum of all positive y-derivatives of the at least one of the plurality of pyramid images present in the mini-patch; and
   a fourth component, the fourth component being the negative of a sum of all negative y-derivatives of the at least one of the plurality of pyramid images present in the mini-patch.

33. The computer program product of claim 23, wherein the computer-readable program code further performs:
   normalizing the one or more feature vectors of each of the one or more patches.

34. The computer program product of claim 33, wherein normalizing the one or more feature vectors comprises:
   determining components of an initial feature vector having values less than a pre-defined threshold; and
   normalizing the components having values less than the pre-determined threshold to a calculated length.

35. The computer program product of claim 34, wherein the calculated length is calculated based at least in part on the pre-defined threshold and a number of the components having values greater than the pre-defined threshold.

36. The computer program product of claim 35, wherein the performance by the computer-readable program code of determining the components of the initial feature vector and normalizing the components having values less than the pre-determined threshold is repeated until no component has a value greater than the pre-defined threshold.

* * * * *